March 30, 1926.

A. O. AUSTIN

ATTACHING MEANS FOR CABLES OR THE LIKE

Filed March 12, 1923

INVENTOR
Arthur O. Austin
BY Nissen & Crane
ATTORNEY

Patented Mar. 30, 1926.

1,578,253

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

ATTACHING MEANS FOR CABLES OR THE LIKE.

Application filed March 12, 1923. Serial No. 624,498.

*To all whom it may concern:*

Be it known that I, ARTHUR O. AUSTIN, a citizen of the United States, residing at Barberton, in the county of Summit and State of Ohio, have invented certain new and useful Improvements in Attaching Means for Cables or the like, of which the following is a specification.

This invention relates to means for attaching cables, or like devices to insulators or holding members and has for its object the provision of attaching means which shall be economical to manufacture, easy to install, and which shall be of improved construction and operation.

The invention is exemplified in the combination and arrangement of parts shown in the accompanying drawing and described in the following specification, and it is more particularly pointed out in the appended claims.

In the drawing—

In attaching a cable to strain insulators which are used in large quantities in railway and power work one of the chief items of cost rises from the attachment of the cables to the ends of the insulators or string of insulators, particularly where the insulators have an eye through which a fitting or cable can be threaded, such as the common small strain or X-strain insulator of the type shown in my Design Patent No. 59,947.

In the present invention an improved means has been devised for attaching a cable to the insulator such that a high strength may be developed and the cost of attachment will be small. In general the invention comprises a fitting through which the conductor or cable may be readily threaded and after passing through the opening in the insulator the end is bent backwardly forming a loop and attached to the fitting.

Figure 1:
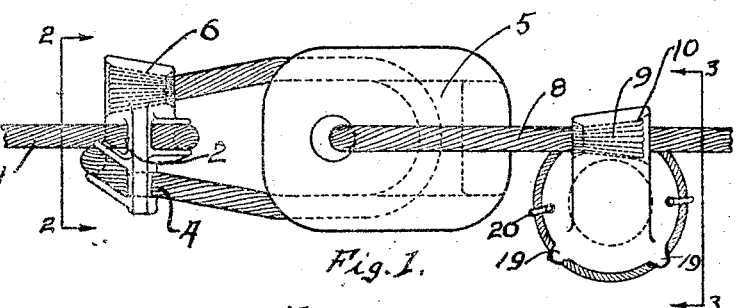
Fig. 1 is an elevation showing one embodiment of the present invention.

In the form of the invention shown in Fig. 1 the strands of the cable may be bound together at the end with a wire or string, or the cable may be tipped with a cap or cone point made of pressed metal so as to prevent the strands from catching on the fitting or insulator when threaded through the holes therein. By previous trial the proper length of the cable may be drawn through hole 2, Figs. 1 and 2, to a given point on the cable. The end of the cable is then brought back through hole 3 in the fitting and passed forwardly through hole 4. It is then threaded through the hole 5 in the insulator. The cable is next threaded through hole 6 in the fitting so that the end of the cable extends beyond the fitting. The ends of the strands are then bent back upon themselves with a pair of pliers having thin jaws. This bending back of the wire will form a cone which may be drawn into the socket 6 where it will be wedged by the tapered formation of the hole or socket. A piece of wire or a thin band may be pressed over the cable and the ends bent back over the same if it is desired to increase the amount of taper of the end of the cable. It is generally found, however, that satisfactory results may be obtained by bending the strands back on themselves without any additional provision. After the strands are thus formed the conical end may be drawn back into the socket where it will be held by the tension on the cable. A cable end attachment formed in this way will usually develop from fifty to seventy-five per cent of the ultimate strength of the cable which is ample to provide for the full strength of the cable leading away from the fitting since only one-half of the load is carried on each reach of the cable between the insulator and fitting. When tension is applied to the cable the turn of the cable about the fitting tightens so that the tension in the cable provides the grip on the fitting. Since one-half of the stress is carried on each reach of the cable threaded through the insulator the turn of the cable on the fitting has to develop only one-half of the tension due to the load in order to prevent slipping of the cable on the fitting.

Figures 2, 3:
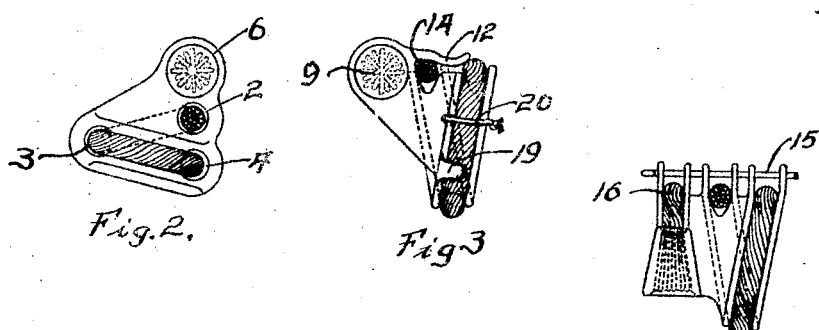
Fig. 2 is a section on line 2—2 of Fig. 1.
Fig. 3 is a section on line 3—3 of Fig. 1.

The friction of the fitting may be materially increased by providing a wedge-shaped groove or seat for the cable as shown in Fig. 3, so that a higher effective bearing will be developed by wedging on the sides of the cable which will increase the friction.

In the form of the invention shown in Fig. 3 and at the right-hand end of Fig. 1, the fitting is somewhat easier to install, as the cable 8 may be threaded through the insulator and the socket 9 before taking a turn around the snubbing portion of the fitting. After the conical end of the cable is formed and drawn into the socket 10 a loop or spiral 11 is made about the fitting so that the end leading away from the insulator will be centrally disposed relative to the reaches of the cable connecting the fitting of the insulator, as shown at 14. This loop is slid over the fitting and after the cable is drawn into the groove a locking tongue 12 may be bent into place so that the cable cannot slip out of the groove. This tongue is simply to keep the cable in proper position until the insulator is in place and tension applied.

Figure 5:
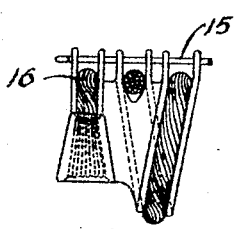
Fig. 5 is a section on line 5—5 of Fig. 4.
Figure 4:
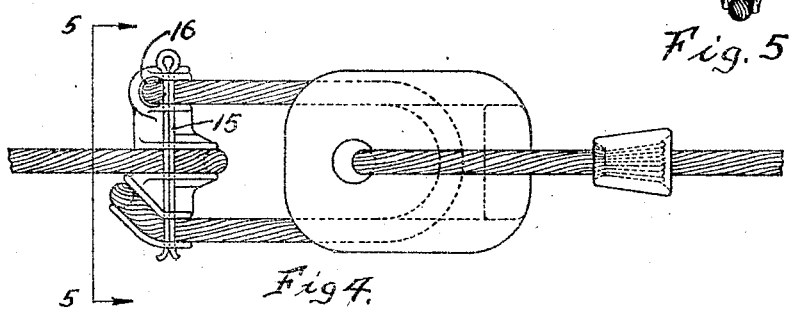
Fig. 4 is an elevation of a somewhat modified form of the invention.

A somewhat different method of locking is shown in Figs. 4 and 5, where a cotter pin 15 is inserted to hold the cable in place. The snubbing devices or fittings in the various forms are preferably made of castings or forgings. In Figs. 4 and 5 the end of the cable is bent or snubbed through an angle at 16 before it is secured in the tapered socket. This adds to the holding power of the cone socket. The cable may be tied or clamped into position on the fitting if found necessary until the insulator is in place when the tension will hold the cable in the groove.

Figure 6:
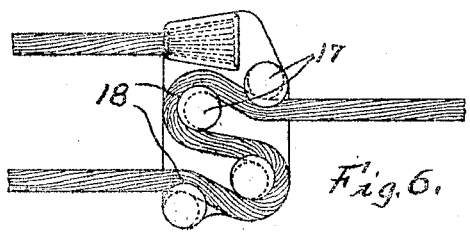
Fig. 6 is an elevation of a different modification.
Figure 7:
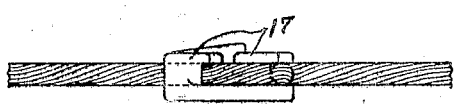
Fig. 7 is a top plan view of the form of the invention shown in Fig. 6.

Another modification of the fitting is shown in Fig. 6. In the form there shown the end of the cable is threaded through the insulator in the manner illustrated in Fig. 5, after which the cable may be bent around the snubbing pins 17 which are grooved so as to retain the cable in place, as shown at 18. The small size and light weight of the fittings makes the invention particularly applicable for railway or catenary work wherever heavy weight is an objection. The fitting or attachment has the further advantage that it is readily installed and will develop a very high ultimate strength in the conductor or cable attached to the insulator. A further advantage is that additional links are not required for connection between the cable and insulator. Special tools are unnecessary for the installation of the fittings and there are no threaded members required for clamping the cable which is provided with a good bearing seat on the insulator.

It is evident that the invention may be used in other places where it is desired to loop the end of a cable to which tension is applied, such as in a connection to a pole or guy anchor. The fitting provides ample bearing surface for the cable and there is no danger of chafing as in the case where strands are pulled against one another.

It will be understood that various forms of devices may be employed for retaining the cable in its seat prior to the placing of the load thereon. In Figs. 1 and 3 there are illustrated tongues 19 which are left open until the cable is wound upon the fitting, after which they may be sent over into the position shown in Fig. 3 to hold the cable. Another form of holder may be provided by means of a wire or cord 20 passed through openings 21 in the fitting and secured about the cable.

I claim:—

1. Means for holding a cable or like device in looped formation, comprising a fitting having one reach of the loop attached thereto and the other reach of the loop wound helically upon said fitting about an axis transverse to the direction of said reaches to provide a frictional attachment between said cable and fitting.

2. Means for holding a cable or like device in looped formation, with the two reaches of the loop extending away from said holding means in substantially the same direction therefrom, said means comprising a fitting having one reach of the loop attached thereto and having a helical groove in which the other reach of the loop is wound about said fitting, the load end of the cable being located between the reaches of the loop end.

3. In combination, a cable, a holding member therefor, and a fitting for securing said cable to said holding member, said cable being looped about said holding member and having one end thereof attached to said fitting and the other end snubbed about said fitting and extending therefrom the portion of said cable snubbed about said fitting forming a loop the axis of which is transverse to the direction of the load on said cable.

4. In combination, a cable, a holding member therefor, and a fitting for securing said cable to said holding member, said cable being looped about said holding member and having one end thereof attached to said fitting, the cable extending from the attachment with said fitting about the holding member to form two reaches of cable between the fitting and holding member, one of said reaches continuing about the fitting in helical formation and extending therefrom to constitute the load holding portion of the cable.

5. In combination, a cable, an insulator having an opening therethrough, and a fitting for securing said cable to said insulator, said cable being looped about said fitting at a position thereon spaced from the end of the cable, the cable end being threaded through the opening in said insulator and returned to said fitting, the returned end of the cable being fixedly secured to the fitting.

6. Means for holding a cable in looped formation, comprising a fitting having an attaching socket for the end of the cable and a grooved seat about which the cable may be wound, and means for retaining the cable in position in said seat, said retaining means being movable into operative position after the cable is placed in its seat.

7. Means for holding a cable in looped formation, comprising a fitting having means thereon for attachment of the end of the cable and having a helical groove about which the cable is wound, and means for retaining said cable in said seat, said retaining means being displaceable to permit the cable to be wound upon said fitting.

8. The combination with a holding member, of a cable looped about said holding member, and a fitting for securing the looped portion of said cable, said fitting comprising a yoke disposed transversely to said cable, the cable engaging said yoke near the middle thereof and being wound upon said yoke toward one end and extending from said end to said holding member and thence about said holding member and back to the opposite end of said yoke, the end of said cable being secured to said yoke at said last mentioned end thereof.

In testimony whereof I have signed my name to this specification on this 7th day of March, A. D. 1923.

ARTHUR O. AUSTIN.